United States Patent [19]
Axelrod

[11] Patent Number: 4,631,133
[45] Date of Patent: Dec. 23, 1986

[54] WASTE TREATMENT DEVICE AND METHOD USING MICROWAVES

[75] Inventor: Burton Axelrod, Girard, Pa.

[73] Assignee: Axelrod R & D, Inc., Austin, Tex.

[21] Appl. No.: 752,153

[22] Filed: Jul. 3, 1985

Related U.S. Application Data

[63] Continuation-in-part of Ser. No. 649,939, Sep. 13, 1984, abandoned.

[51] Int. Cl.[4] .......................... C02F 1/02; C02F 1/30; B01D 35/18; F23G 7/04
[52] U.S. Cl. .................................... 210/739; 210/748; 210/769; 210/774; 210/98; 210/138; 210/184; 210/407; 210/502.1; 110/250
[58] Field of Search ................ 210/768, 774, 744, 184, 210/185, 186, 187, 98, 103, 138, 502, 407, 748, 769, 739; 110/250, 238, 346

[56] References Cited

U.S. PATENT DOCUMENTS

| | | | |
|---|---|---|---|
| 506,879 | 10/1893 | Jewell | 210/184 |
| 506,880 | 10/1893 | Jewell | 210/769 |
| 3,277,580 | 10/1966 | Tooby | 159/DIG. 15 |
| 3,495,648 | 2/1970 | Amadon | 219/10.65 |
| 3,523,076 | 8/1970 | Goerz, Jr. et al. | 210/748 |
| 3,568,838 | 3/1971 | Appelgren et al. | 210/185 |
| 3,655,048 | 4/1972 | Pergola | 210/769 |
| 3,659,714 | 5/1972 | Valdespino | 210/138 |
| 3,670,891 | 6/1972 | Allen | 210/138 |
| 3,677,404 | 7/1972 | Staffin | 210/268 |
| 3,692,186 | 9/1972 | Marzocchi | 210/502.1 |
| 3,700,565 | 10/1972 | Cornish et al. | 210/748 |
| 3,864,258 | 2/1975 | Richardson et al. | 210/396 |
| 4,019,021 | 4/1977 | Schladitz | 219/374 |
| 4,044,696 | 8/1977 | Marincek | 210/774 |
| 4,439,317 | 3/1984 | Jarrell | 210/151 |
| 4,439,321 | 3/1984 | Taki et al. | 210/493.5 |

OTHER PUBLICATIONS

"Wastewater System Uses Microwaves", *Chemical Engineering*, vol. 84, No. 3, pp. 77-78, Jan. 31, 1977.
Patent Abstract of Japan, vol. 7, No. 50 (M-197) (1195), Feb. 26, 1983 (JP, A, 57198916, Dec. 6, 1982).

*Primary Examiner*—Benoit Castel
*Assistant Examiner*—Linda S. Evans
*Attorney, Agent, or Firm*—Arnold, White & Durkee

[57] ABSTRACT

A method and device for separating most of the waste material from sewage effluent, which incinerates a large portion of the waste to dispose of the waste in an environmentally safe manner. After separation, the aqueous by-product from the sewage effluent is substantially waste free, allowing easy disposition or further treatment. The apparatus includes a housing and a filter in the housing to which the sewage effluent is introduced. The solid waste materials are trapped in the filter with a substantially aqueous by-product discharged from the device. A switch senses entry of the sewage effluent, starting operation of a heating element and a microwave generator which operate to substantially incinerate the waste material into an ash particulate. The gaseous by-products of the incineration are vented to the atmosphere and the ash particulate is vacummed into a temporary storage container.

15 Claims, 3 Drawing Figures

WASTE TREATMENT DEVICE AND METHOD USING MICROWAVES

This application is a continuation-in-part of Ser. No. 649,939 filed Sept. 13, 1984, now abandoned.

BACKGROUND OF THE INVENTION

1. Field of the Invention

This invention relates to a method and device for treating sewage effluent at the source, for example at a business, residence, or the like. The method and device of the present invention separates most of the solid waste material from the sewage effluent and incinerates the solid waste material into an ash particulate, allowing for easy, environmentally safe, disposal.

2. Description of the Prior Art

Typically, sewage effluent is disposed of by connecting the toilet system of a residence or business to a sewer system for treatment at a municipal main sewage treatment plant. That is, the waste material, mainly fecal matter and urine, is suspended in water and flushed by the water to the treatment plant. Such treatment plants typically employ chemical and bacteriological treatment methods for decomposing and purifying the sewage effluent.

Such municipal treatment systems are normally effective, but do present a number of deficiencies. First, such sewer systems are not widely available. For example, in rural areas sewer systems typically cannot be efficiently installed. Further, even in urban areas, high population growth has in some cases exceeded sewage treatment facilities, necessitating a moratorium on hook-ups to the system. Expansion and development of sewage treatment plants is not only expensive, but also requires long lead times. During such a moratorium on sewage hook-ups to a sewer system, construction of residences and businesses is stymied and growth inhibited.

In rural areas where sewer systems with treatment plants are not cost effective, cesspools and septic tanks are widely used for treating the sewage effluent. Of course, in some cases raw sewage effluent is discharged directly into waterways. Cesspools and septic tanks are both deficient in that they require bacterial breakdown of the solid waste and subsequent drainage into adjoining leaching fields or overflow tanks or even into waterways. Of course, such drainage may clog up and render largely ineffective the waste disposal cesspools or septic tanks. Cesspools and septic tanks are also deficient in that they typically require a relatively large amount of fresh water to operate the systems.

It is an advantage for a septic system to have land which can sufficiently percolate to drain the leached water. In some rocky or mountainous regions the soil conditions do not allow adequate percolation or drainage for operation of such septic systems. Further, excavation costs can be prohibitive to the installation of such systems. Still another difficulty is that cesspools and septic systems require biolysis or bacterial breakdown of the solid matter in a putrefaction process. This putrefaction process is often environmentally offensive and poses a potential health hazard.

Several "on location" (located at the source) sewage treatment systems have been devised which use grinders to pretreat the sewage and holding tanks for subsequent bacterial breakdown. U.S. Pat. No. 4,439,317 typifies such a sewage treatment system. However, such currently proposed "on location" sewage treatment systems are not only complicated and expensive, but also present many of the operational problems and health risks associated with conventional septic tanks.

Therefore, it would be an advance in the art if an "on location" sewage treatment method and device were developed which separated, all or most of the waste material from sewage effluent and disposed of the waste material in an efficient, environmentally safe manner.

SUMMARY OF THE INVENTION

The problems outlined above are largely solved by the waste treatment system of the present invention. That is, the waste treatment method and apparatus hereof separates most of the waste material from sewage effluent and disposes of the waste material in an environmentally safe manner. The waste material is incinerated by the device of the present invention leaving a small amount of ash particulate which is collected into a temporary storage container. Separation of most of the waste material from the sewage effluent leaves a "gray" water or aqueous discharge component which is substantially purified. This aqueous component is either further treated or discharged into a conventional municipal sewage treatment system. Thus, in areas not treated by municipal sewage systems the present invention provides an alternative to conventional cesspools and septic tanks, disposing of the waste material in an environmentally safe manner and eliminating the sometimes expensive excavation costs and problems associated with septic systems. In areas served by municipal sewer systems, the present invention disposes of most of the waste material from the sewage effluent in an environmentally safe manner alleviating the burden and over capacity difficulties on such municipal sewer systems.

Generally speaking, the separation device hereof includes a housing having an inlet for receiving the sewage effluent into the housing. A filter media is interposed in the housing to receive the sewage effluent and is preferably composed, at least in part, of coarse, fused silica cullet which traps a large portion of the solid waste material. Preferably, the filter media also contains an absorbent material adjacent the cullet region to trap and purify the smaller particles of waste material (such as found in urine). The aqueous component or "gray" water emerges from the filter media and is disposed of or recycled, depending on the particular application.

Entry of the sewage effluent into the device begins operation of the disposal cycle for eliminating the waste material from the filter region. A heating element is disposed within the housing adjacent the filter media and operates upon entry of sewage effluent to thermally heat the waste material. Additionally, a radiation mechanism, such as a microwave generator, operates to raise the temperature of the waste material. The waste material is effectively incinerated within the filter media leaving a small amount of ash particulate. The term "incinerate" is used in the present application to include burning or combustion, dehydration, or any combination thereof. At the end of the disposal cycle a removal mechanism, such as a vacuum operates to transport the ash particulate into a temporary storage container.

DESCRIPTION OF THE PREFERRED EMBODIMENT

Figure 1:
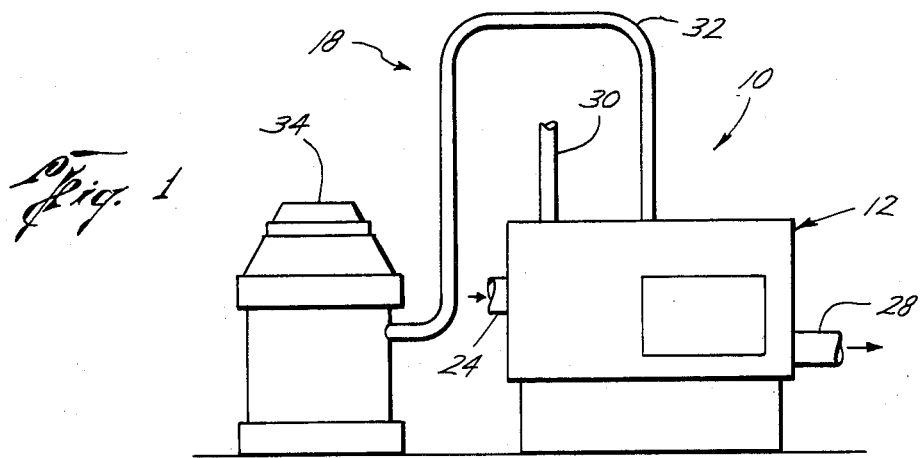
FIG. 1 is a fragmentary, somewhat schematic, elevational view of the device of the present invention.

Turning now to the drawing, a sewage treatment device 10 in accordance with the present invention is illustrated. Broadly speaking, the device 10 includes a housing 12, filter media 14 disposed within the housing 12, incinerator mechanism 16, and vacuum system 18. As shown in the drawing, the housing 12 incorporates an outer cover 20 and an inner casing 22. An inlet 24 having a flow sensing switch 26 therein transverses the outer cover 20 to communicate with the inner casing 22 (see FIG. 2). In similar fashion, outlet 28 communicates with the casing 22 and bridges the outer cover 20 (right hand margin of FIG. 2). Along the uppermost portion of the device 10, vent pipe 30 is connected in communication with the casing 22 with its other end exposed to the atmosphere. A vacuum pipe 32 similarly communicates with casing 22, passes through outer cover 20 and is connected in the vacuum system 18. Viewing FIG. 1, the vacuum system 18 preferably comprises the vacuum pipe 32 connected to a conventional wet vacuum 34 having a storage cannister.

The filter media 14 presents a first region 40 approximate to the inlet 24. The region 40 generally comprises fused silica cullet (i.e. crushed and broken glass shards) which is transparent to microwave radiation and which presents a coarsely porous fluid flow path (see FIG. 2). Adjacent the cullet region 40 is an intermediate region 42 comprising an absorbent material such as fine silica which is preferably transparent to microwaves and finely porous for permitting fluid flow. Volcanic or lava rock has also been successfully used as the absorbent material. Finally, the filter media 14 presents perforated sheet 44 adjacent outlet 28 retaining the absorbent material 42 and also acting to reflect or choke microwave radiation.

Figure 2:
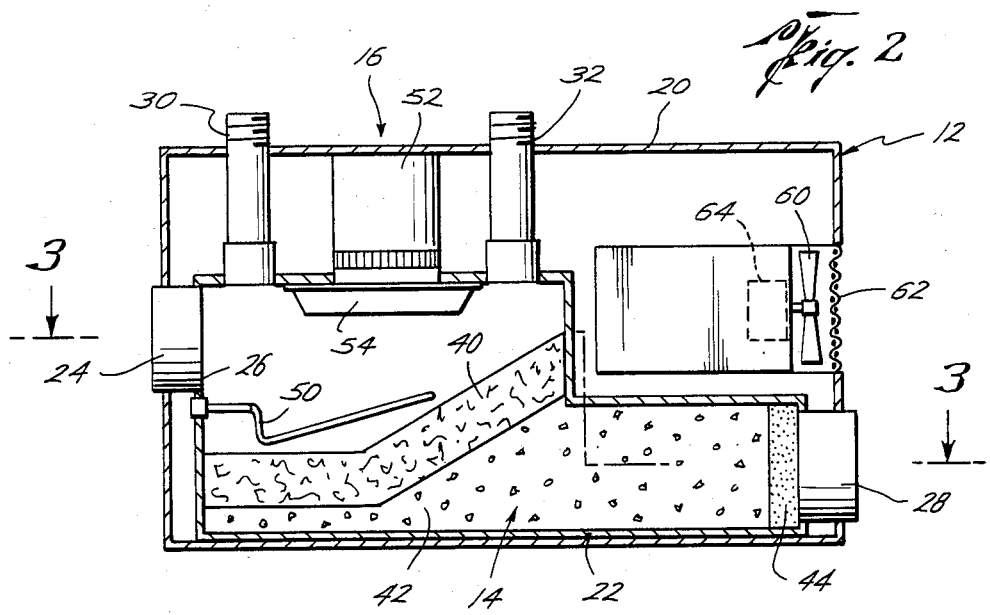
FIG. 2 is a vertical sectional view of a portion of the device hereof, particularly illustrating the filter media and incinerating mechanism.
Figure 3:
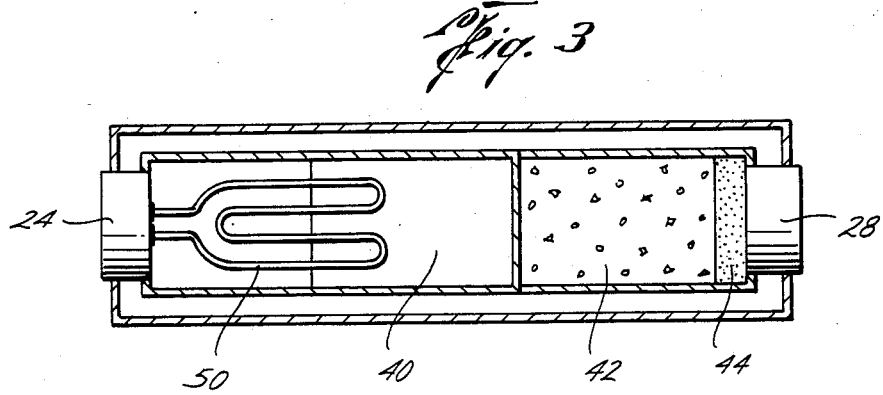
FIG. 3 is a sectional view taken along line 3—3 of FIG. 2.

The incinerator mechanism 16 primarily includes heating element 50 and microwave generator 52. The heating element 50 is conventional in design, consisting of a coil or grid, and is preferably of the electrical resistance type for thermal convection heating of the space around the element 50. The heating element 50 is located in the casing 22 above the filter media 14 (FIG. 2) in a "reaction" or empty space. The microwave generator 52 includes a magnetron, high voltage capacitor, and a transformer. As can be seen in FIG. 2, a seal plate 54 acts as a barrier between the microwaver generator 52 and the interior of the casing 22. The plate 54 comprises a ceramic or high temperature plastic material which is microwave transparent and is water-proofed to protect the components of the microwave generator 52.

Illustrated somewhat schematically in FIG. 2 is a cooling fan 60 adjacent grid 62 in the outer cover 20. Adjacent the fan 60 is a timer 64 operably interconnected between the flow switch 26, incinerator mechanism 16 and vacuum system 18.

OPERATION

In use, the sewage treatment device 10 is designed for low cost mass production and is of a compact design for easy installation in most residences or other "on location" operations. The inlet 24 is coupled to the internal sewer system of the residence so that when a toilet is flushed, the water borne waste enters through inlet 24 into the reaction chamber in casing 22. The sewage effluent passes flow switch 26, in turn activating the timer 64.

The sewage effluent encounters the filter media 14 and through gravitational forces tends to percolate therethrough. The largest solid waste materials in the sewage effluent are trapped on the shards and in the coarse pores of the cullet material in the region 40. Most of the remaining particles in the sewage effluent are trapped within the more absorbent material in the region 42. For example, many of the constituents of urine waste are trapped in the region 42. Thus, the filter media 14 for the most part separate the sewage effluent into a waste material component trapped within the media 14 and a "gray" water or aqueous component exiting the casing 22 through the outlet 28.

The remaining contaminants in the clarified "gray" water or aqueous component are easily dealt with, depending upon the particular application, soil conditions and environmental factors. For example, the aqueous component can be evaporated in a settling pool, sterilized, chlorinated, aerated, or further filtrated (e.g. reverse osmosis). Additionally, it can be recycled through the inlet 24. In the preferred embodiment it is contemplated that the clarified aqueous component is simply discharged into a municipal sewer system or into a water way.

With the waste material trapped in the reaction chamber above the filter media 14 or within the filter media 14, the flow switch 26 has activated the timer 64 beginning the incineration cycle. Initially, the heating element 50 operates to raise the thermal temperature within the casing 22. In this regard, it is noted that the cooling fan 60 operates to cool the components and area surrounding the casing 22 within the cover 20. Further, the microwave generator 52 is activated, radiating the interior of casing 22. Of course, the microwave radiation vibrates the organic matter of the waste material causing internal frictional heating. The operation of the heating element 50 and microwave generator 52 effectively burn the waste material, reducing the waste material into an innocuous fine ash particulate. The gaseous by-products of the incineration cycle are vented to the atmosphere through vent pipe 30. At the end of the incinerator cycle, the timer 64 activates the vacuum system 18 with the ash particulate being removed through pipe 32 into the temporary storage cannister of the vacuum 34.

Of course, many variations are possible in the specific construction of the treatment device 10 of the present invention. For example, the vacuum system 18 can be made integral within the outer cover 20. Further, the placement of the heating element 50 and microwave generator 52 can be varied and reoriented depending upon the constructional features and design of the casing 22. Another important variation is the dimensions of the reactive chamber within the casing 22 and the dimensions of the absorbent region 42. In fact, the casing 22 can be constructed in a two piece arrangement with the reactive portion comprising the heating element 50 and microwave generator 52 in a separate casing connected by an adapter collar to a lower casing having portions of the filter media 14. Further, the filter media 14 can comprise only the cullet material in a single region 40. Those skilled in the art will appreciate that many other variations are possible without detracting from the scope and content of the present invention.

The sewage treatment device 10 in accordance with the present invention is particularly appropriate for use in rural areas where conventional municipal sewage treatment systems are not available. This is especially true in rural areas where soil conditions or environmental factors make cesspool, septic tanks, and other conventional sewage treatment devices undesirable or cost prohibitive. The device 10 is particularly useful in applications where in the past, raw sewage has been directly discharged into waterways.

Additionally, the sewage treatment device 10 is appropriate for "on location" sewage treatment with the clarified "gray" water or aqueous component being discharged from the outlet 28 into the municipal sewage system. However, instead of obtaining the sewage effluent directly, the municipal sewage system receives only a clarified "gray" water which is substantially waste free. Such use is particularly advantageous where the sewer system capacity, treatment plant capacity, or water availability is marginal. Thus, use of the sewage treatment device 10 coupled to a residence or building would substantially alleviate the over burden on a municipal sewage system or expand its capacity.

I claim:

1. A device for separating and disposing of solid waste material from sewage efflucent, comprising:
   a housing;
   an inlet in the housing for introducing sewage effluent into the housing;
   filter means disposed in the housing for receiving the sewage effluent introduced into the housing, said filter means having a portion transparent to microwaves and being operable for trapping a generally solid waste material component of the sewage effluent in the microwave transparent portion and passing therethrough a generally aqueous component;
   an outlet in the housing for releasing said aqueous component from the housing;
   means for incinerating said solid waste material component trapped in the microwave transparent portion of the filter means and operable for reducing said waste material component into an ash particulate, including,
   microwave generator means oriented and operable for treating and dehydrating with microwaves the solid waste material trapped by said microwave transparent filter portion, and
   heating element means for cooperating with the microwave generator means to incinerate the solid waste material component: and
   means for removing the ash particulate from the housing.

2. The device according to claim 1, wherein said heating element is disposed in the housing for elevating the temperature therein.

3. The device according to claim 1, said removing means including suction means operable to pneumatically remove ash particulate from the filter means.

4. The device according to claim 1, said filter means including a region of coarse, fused silica cullet for initially trapping the largest particles of solid waste material.

5. The device according to claim 1, said filter means including a region of absorbent material for trapping microscopic particles of waste material.

6. The device according to claim 1, including switch means for initiating operation of the incinerating means when passing sewage effluent through the housing.

7. The device according to claim 6, including a timer for operating said incinerating means for a certain duration after activation by said switch means.

8. The device according to claim 1, said heating element means disposed within said housing adjacent said filter means and said microwave generator means disposed for irradiating the microwave transparent portion of the filter media for dehydrating trapped waste material, the heating element and microwave generator means being cooperatively operable for burning waste material trapped in said portion of the filter media.

9. A method of separating and disposing the solid waste material from sewage effluent, comprising the steps of:
   introducing the sewage effluent to a filter media;
   separating the sewage effluent into a waste material component suspended in the filter media and a generally aqueous component;
   incinerating the waste material component suspended in the filter media into a generally ash particulate, including,
   irradiating the waste material component suspended in the filter media with microwaves and heating the waste material component suspended in the filter media, whereby said irradiating and heating cooperate to burn the waste material component suspended in the filter media; and
   removing the ash particulate from the filter media.

10. The method according to claim 9, said incinerating step including the substep of,
    heating the waste material component suspended in the filter media with a thermal convection mechanism.

11. The method according to claim 9, said separating step including the substep of,
    passing the sewage effluent through a region of the filter media comprising a coarse, cullet material for trapping larger solid waste particles in said region.

12. The method according to claim 11, including the substep of,
    passing the effluent emerging from the coarse, cullet material through a filter region of absorbent material.

13. The method according to claim 9, said removing step
    including operating a vacuum device to remove the ash particulate.

14. The method according to claim 9, including the step of,
    sensing the passage of sewage effluent and activating a timer for initiating operation of the incineration of the waste material components.

15. A waste material treatment device comprising:
    a housing adapted for receiving a waste material containing effluent:
    a microwave transparent filter stationarily disposed in the housing for contacting the effluent and presenting a plurality of fluid flow pathways for allowing gravity flow of an aqueous portion of the effluent therethrough and for trapping a solid portion of the effluent therein;
    incinerating means for reducing the trapped solid portion of the effluent into ash particulate, including—
    microwave generator means for treating and dehydrating the trapped solid portion with microwaves, and
    thermal heating element means disposed proximate the filter for cooperating with the microwave generator means to incinerate at least a part of the trapped solid portion.

* * * * *